(No Model.)
A. FELDMANN.
APPARATUS FOR THE MANUFACTURE OF AMMONIA.
No. 278,115. Patented May 22, 1883.
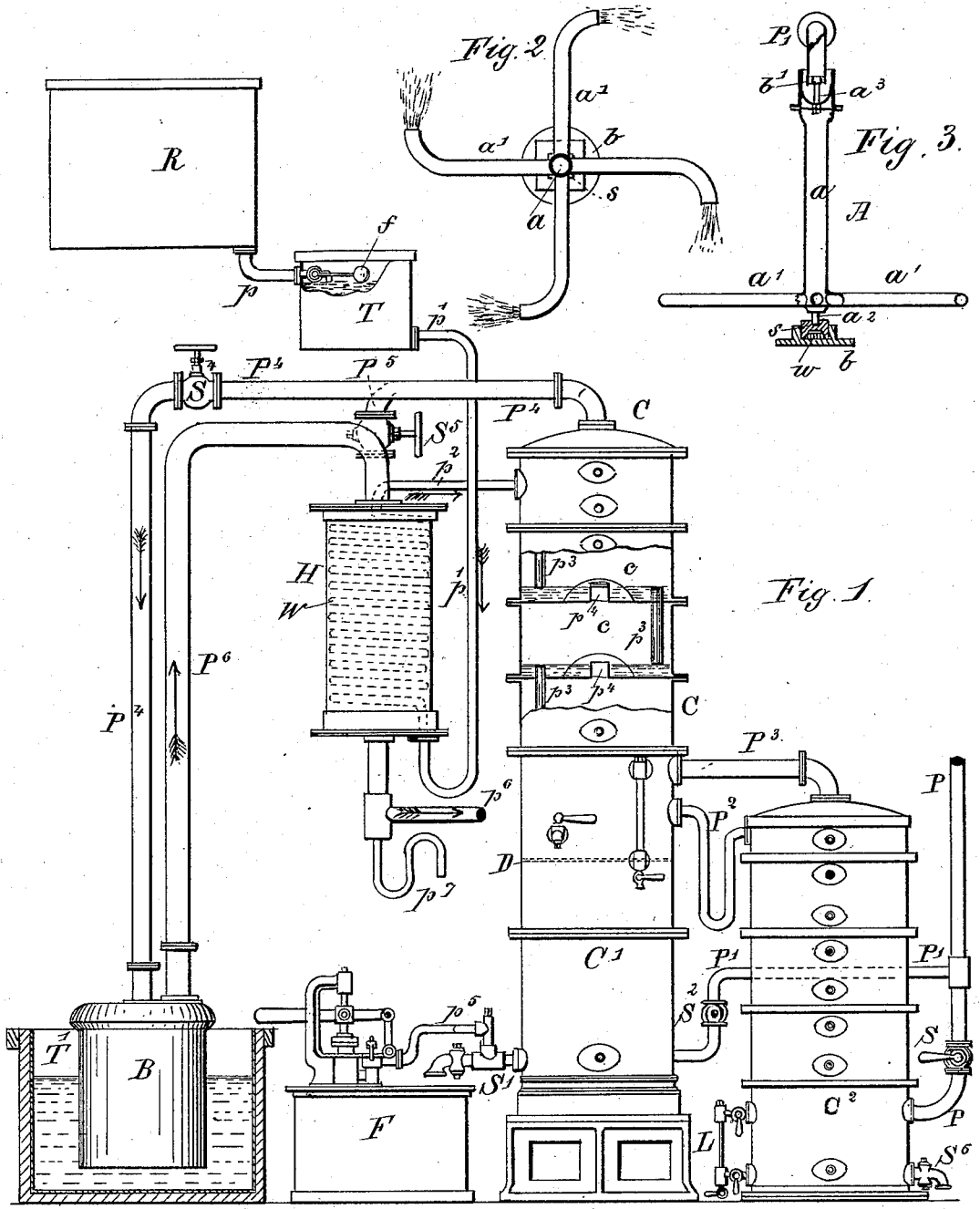

UNITED STATES PATENT OFFICE.

ALFRED FELDMANN, OF BREMEN, GERMANY.

APPARATUS FOR THE MANUFACTURE OF AMMONIA.

SPECIFICATION forming part of Letters Patent No. 278,115, dated May 22, 1883.

Application filed December 11, 1882. (No model.) Patented in Germany March 12, 1882, No. 21,708; in England August 1, 1882, No. 3,643, and in Italy September 30, 1882, XXIX, 58.

*To all whom it may concern:*

Be it known that I, ALFRED FELDMANN, doctor of philosophy, citizen of the free town of Bremen, residing at Bremen, German Empire, have invented certain new and useful Improvements in the Manufacture of Ammonia and in Apparatus Therefor; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists in improvements in the process of and apparatus for the distillation of ammoniacal liquors, as hereinafter described, and specifically pointed out in the claims.

My invention has for its object the complete elimination of the ammonia from the ammoniacal liquors, to make the distillation of said liquors a continuous or uninterrupted one, and to provide means whereby the obnoxious gases resulting from this distillation are effectually destroyed.

The improved process of distillation of ammoniacal liquors from gas or bone-black works, or from the treatment of other substances rich in nitrogen, involves the following principal characteristics, to wit: To pass the heated liquor over extended surfaces in contact with steam, decomposing the liquor under agitation by means of milk of lime and steam, decanting the clarified liquor and passing it over extended surfaces in contact with steam for final decomposition, said liquor flowing uninterruptedly in one direction while the products of distillation pass in a reverse direction in the path of the liquor, eliminating the ammoniacal gases from the products of distillation by conversion into sulphate of ammonia, and burning the obnoxious gases or destroying their deleterious influences.

To carry out such a process and make it a continuous one, a specifically-constructed apparatus is required, which I have shown in the accompanying drawings, in which—

Figure 1 is a vertical elevation, partly in section; and Figs. 2 and 3 are detail views of the agitator employed.

This apparatus is composed, essentially, of one or more columns—namely, a distilling-column and a decomposing and second distilling column—which may be arranged one by the side of the other, or the distilling and the decomposing column may be arranged one above the other, as shown, or all three columns may be so arranged. I prefer the arrangement shown, as I have found it very effective and convenient. The apparatus is further composed of feeding appliances, whereby the liquor may be heated by the waste gases or the products of distillation before passing it to the distilling apparatus, appliances to eliminate the ammoniacal gases from the noxious gases and remove the latter for destruction, the whole apparatus being so arranged for operation as to prevent all access of air thereto, and so that the ammoniacal liquor will be fed to and through the apparatus in one direction, the volatile products eliminated therefrom, and the spent liquor drawn off, while the products of distillation will pass in a reverse direction through the apparatus to a condenser or converter. It is evident that with such a construction of apparatus the distillation of the liquor may be carried on at a minimum expense, with a maximum product as a result thereof.

In Fig. 1 of the drawings, R indicates a reservoir that contains the ammoniacal liquor, from the bottom of which leads a pipe, $p$, that connects with the top of a feed-tank, T. The discharge end of the pipe $p$ is provided with a stop-cock operated by a float, $f$, that serves to maintain the liquor at a uniform level in T, and feed it at a uniform volume and pressure through the medium of the pipe $p'$ to a heater, H, in which is contained a worm, W, (shown in dotted lines,) with the lower end of which the pipe $p'$ is connected. The liquor ascends through this worm, and is heated by the spent gases or the products of distillation, as hereinafter described, and forced through pipe $p^2$ from the heater H to the top of the column C, for which purpose the feed-tank is located at a sufficient distance above the heater and column, as will be readily understood. The column C is divided into a series of chambers, $c$, by means of diaphragms, from each of which depends a pipe, $p^3$, that carries the liquor from one chamber to the other. The inlet-orifice of pipe $p^3$ rises slightly above the diaphragm, to always maintain a certain depth of liquor on the latter. Each diaphragm is further provided with a central short pipe, $p^4$, through which the gases or products of the distillation pass. From the lowest chamber of the column the liquor passes to a decomposing-column, C', upon which the column C is seated. In its bottom is arranged a vertically-adjustable agitator, A, of peculiar construction, which serves at the same time as a means for supplying the steam. This agitator I have shown on an enlarged scale in plan and elevation in Figs. 2 and 3, respectively. The agitator is composed of a pipe, $a$, carrying at one end four (more or less) radially-arranged pipes, $a'$, having their outlet-orifices curved in the direction of rotation. The lower end of the pipe $a$ is provided with a spindle or pivot, $a^2$, adapted to rotate in a step, $s$, that is vertically adjustable upon a bed-plate, $b$, by means of the wedge $w$.

The upper end of the pipe $a$ is provided with a spider, in the center of which is a pivot, $a^3$, adapted to rotate in a socket-bearing, $b'$, formed upon the discharge-orifice of the steam-pipe P'. This agitator operates on the principle of the Legner water-wheel, and, while it agitates the liquor, supplies at the same time the necessary steam to assist in the decomposition of the same.

The column C' is provided with a discharge stop-cock, S', and to the pipe, between this stop-cock and the column, is coupled a pipe, $p^5$, connected with a force-pump, F, for supplying milk of lime in suitable quantities to the column C'.

By means of the described construction of agitator I am enabled to thoroughly mix the liquor and milk of lime and completely decompose the former, giving it a rotating motion, whereby the steam is distributed and intimately mixed with the liquor. The rotation of the agitator may be regulated within certain limits by means of the wedge $w$, which, when driven more or less between the step and its bed-plate, will tighten the pivots of the agitator correspondingly, as will be readily understood.

In order to more readily precipitate the lime from the agitated liquor in the upper part of the decomposing-chamber, I apply a perforated diaphragm, D, (shown in dotted lines in Fig. 1,) at a point about two-thirds (more or less) of the height of the chamber, to arrest the movement of the liquor at that point.

The admission of steam through the agitator is so adjusted by means of the stop-cock $S^2$ of the branch steam-supply pipe P' that the decomposed ammoniacal liquor will flow off clear at the overflow, and thence through the bent pipe $P^2$ into column $C^2$. The column $C^2$ is, like column C, divided into a series of chambers by means of diaphragms or partitions provided with overflow-pipes and passages or pipes for the products of distillation, and the steam is admitted at the lower end of column $C^2$ from the main steam-supply pipe P, provided with a stop-cock, S, for regulating the volume of steam according to the volume and strength of the decomposed ammoniacal liquor.

By means of this construction and mode of operation the regular and systematic utilization of the excess of lime is made possible. When the clear decomposed ammoniacal liquor reaches the foot of the column $C^2$ it will be found completely exhausted of all its ammoniacal or volatile constituents, and is drawn off by means of a stop-cock, $S^6$, and the discharge regulated according to the volume of spent liquor that reaches the lower chamber of said column $C^2$, which may be ascertained at any time by the level-indicator L. The mixed steam and products of distillation pass from the column $C^2$ through pipe $P^3$ into column C, where they mingle with the steam, and the products of distillation of said column ascend therein and pass out at the top thereof through a pipe, $P^4$, provided with a stop-cock, $S^4$, into a leaden or lead-lined gasometer-bell, B, partially immersed in sulphuric acid contained in a leaden or lead-lined tank, T'. Here the ammoniacal gases are converted into sulphate of ammonia when the apparatus is employed for this purpose, while the steam and other gases not absorbed—such as carbonic-acid gas, sulphureted hydrogen, &c.—pass out through pipe $P^6$ into the heater and condenser H, from which they escape freed from steam through a pipe, $p^6$, into a furnace or other suitable apparatus, in which they are consumed or their deleterious influences destroyed.

The products of condensation are drawn off through the bent pipe $p^7$. The arrangement and combination of the gasometer-bell with the distilling apparatus is a novel one and produces results not heretofore obtained in this branch of the arts. It provides a convenient means whereby the obnoxious gases resulting from the described treatment and distillation of ammoniacal liquors may be readily separated from the ammoniacal gases and destroyed. The attendant is enabled to inspect at all times the progress of the reaction and conversion, it facilitates the removal of the sulphates and the supplying of the tank with sulphuric acid, as required, and without any danger of an escape of either ammoniacal or deleterious gases, which is not possible when the usual closed converters are employed; and, finally, it obviates the necessity of employing a series of converters in a continuous or uninterrupted distillation, which is necessary in the construction of apparatus heretofore used.

If, instead of sulphate of ammonia, the so-called "concentrated gas-water" is to be obtained, then the pipe $P^4$ is connected directly with the condenser and heater H through the medium of the branch pipe $P^5$ of pipe $P^4$ by opening the stop-cock $S^5$ and closing the stop-cock $S^4$. The concentrated ammoniacal water passes then out of pipe $p^6$, the pipe $p^7$ being removed or access thereto of the product stopped, and a cooler is connected with pipe $p^6$ to condense and cool the product because the cold from the coil W is not sufficient to condense all the products of distillation during their passage through the condenser and heater H.

It will be observed that either the deleterious gases, as they reach the heater from the bell when the apparatus is employed for the manufacture of sulphate of ammonia, are utilized to partially heat the ammoniacal liquor flowing through the coil W, and their watery constituents condensed at the same time, or the products of distillation are utilized to partially heat the liquor passing through the coil when concentrated ammoniacal or gas-water is to be produced and said products are partially condensed, so that the vessel H performs the function of both heater and condenser.

It will be further observed, as already stated, that the liquor passes through the apparatus in one direction, and is decomposed and deprived of its most volatile constituents, while the products of distillation, together with such steam as is not condensed on the way, pass through the apparatus in a reverse direction, heating the liquor as it passes from compartment to compartment.

It will be further observed that the several points of the apparatus at which atmospheric air may have access to the columns C C' C²—namely, at the reservoir R, the stop-cocks S' S², the pump F, and the pipes $p^6$ $p^7$—are all effectually sealed against such access of atmospheric air by the liquor, the spent liquor, and the milk of lime, and stop-cock S' on the one hand, and by the acid and the products of condensation on the other, and that said closures do not interfere with the continuous operation of the distillation.

It will be also observed that the milk of lime and condensed steam may be discharged from the column C', whenever required, through the same pipe employed for feeding the same.

Having now described my invention, I claim—

1. In an apparatus for the distillation of ammonia from ammoniacal liquor, a decomposing-chamber provided with an agitator in which the liquor is decomposed under agitation by means of milk of lime and steam, said chamber being of such a height as to allow the lime to precipitate from the decomposed liquor while being agitated and the supernatant clear liquor to flow off, as described, for the purposes specified.

2. In an apparatus for the distillation of ammoniacal liquors and the conversion of the ammonical gases, a gasometer-bell immersed in the converting-liquid contained in an open tank and connected with the dischage-pipe for the products of distillation, substantially as and for the purposes specified.

3. In an apparatus for the distillation of ammoniacal liquors, the conversion of the ammoniacal gases and elimination therefrom of the other products of distillation, a gasometer-bell immersed in the converting-liquid contained in an open tank, and connected with the discharge-pipe for the products of distillation and with an escape-pipe for the gases not affected by the converting agent, substantially as and for the purposes specified.

4. The combination, with the discharge-pipe of the decomposing-column C' and a force-pump, of the discharge-pipe for said force-pump, connected with and discharging into the discharge-pipe of the column, whereby the decomposing agent may be charged and discharged through the same pipe, substantially as specified.

5. The combination, with the feed-tank, the column C, and the heater-condenser provided with a worm connected with said feed-tank and column, of a gasometer-bell partially immersed in a converting-liquid, said bell being connected by pipes with the column and heater-condenser, whereby the products of distillation may be carried to the bell and converting agent and partially converted, and the unconverted product carried to the heater-condenser for partial condensation and the heating of the fluid passing through the worm, as set forth.

6. In an apparatus for distilling ammoniacal liquors, the reaction-wheel adapted to supply steam to the lower part of the distilling-column, constructed and operating substantially as shown and described, for the purpose specified.

7. In apparatus for distilling ammoniacal liquors, the combination, with the decomposing-column C' and the perforated diaphragm D, of the steam-actuated agitator A, all constructed and arranged for co-operation substantially as and for the purposes specified.

8. The combination of the columns C C' C², the pipes P P² P³, stop-cocks S' S⁶, the tank T, pipe $p'$, and worm W with the pipe P⁴, the bell B, and tank T', whereby the liquid may traverse the columns in one direction and the products of the distillation in the path of the liquid in a reverse direction, and the spent liquid drawn off in continuity and without access of air to the column or connections, as described, for the purposes specified.

9. The combination, with the tank T and column C, of the heater H, its coil W, connected with the tank and column, the pipes $p^6$ $p^7$, the tank T', and the bell B, in communication with the column and heater, substantially as and for the purpose specified.

10. The combination, with the column C, the tank T', bell B, and heater H, having pipe $p^6$, of the pipes P⁴ P⁵ P⁶ and stop-cocks S⁴ S⁵, substantially as and for the purposes specified.

In testimony whereof I affix my signature in presence of two witnesses.

ALFRED FELDMANN.

Witnesses:
T. F. BOCKELMANNY,
L. H. MÜLLER.